United States Patent
Xu

(10) Patent No.: US 8,149,852 B2
(45) Date of Patent: Apr. 3, 2012

(54) TRANSMISSION METHOD, SYSTEM AND ROUTER BASED ON A BORDER GATEWAY PROTOCOL

(75) Inventor: Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 12/470,160

(22) Filed: May 21, 2009

(65) Prior Publication Data

US 2009/0225765 A1  Sep. 10, 2009

Related U.S. Application Data

(63) Continuation of application No. PCT/CN2008/071694, filed on Jul. 18, 2008.

(30) Foreign Application Priority Data

Jul. 25, 2007  (CN) .......................... 2007 1 0137523
Aug. 31, 2007  (CN) .......................... 2007 1 0145705

(51) Int. Cl.
*H04L 12/28* (2006.01)
*H04J 1/16* (2006.01)
*G08C 15/00* (2006.01)
*G06F 11/00* (2006.01)
*G01R 31/08* (2006.01)

(52) U.S. Cl. ........ 370/401; 370/217; 370/238; 370/409; 709/238

(58) Field of Classification Search .......... 370/219–238, 370/351–372, 389–392, 397–401; 709/238–241
See application file for complete search history.

(56) References Cited

U.S. PATENT DOCUMENTS

| 5,579,307 | A  | * | 11/1996 | Richetta et al. | ............... | 370/409 |
| 7,477,593 | B2 | * | 1/2009 | Scudder et al. | ............... | 370/217 |
| 7,817,539 | B2 | * | 10/2010 | Lysne et al. | ................... | 370/219 |
| 7,826,461 | B2 | * | 11/2010 | Okagawa et al. | ............. | 370/397 |
| 7,852,772 | B2 | * | 12/2010 | Filsfils et al. | ................. | 370/238 |
| 2003/0142679 | A1 | * | 7/2003 | Okagawa et al. | ............. | 370/397 |
| 2006/0221813 | A1 |   | 10/2006 | Scudder et al. | | |
| 2007/0070883 | A1 |   | 3/2007 | Lysne et al. | | |

(Continued)

FOREIGN PATENT DOCUMENTS

CN  1431805 A  7/2003

(Continued)

OTHER PUBLICATIONS

State Intellectual Property Office of the People's Republic of China, Examination Report in Chinese Patent Application No. 200710145705.2 (Apr. 14, 2010).

(Continued)

*Primary Examiner* — M. Phan
(74) *Attorney, Agent, or Firm* — Leydig, Voit & Mayer, Ltd.

(57) ABSTRACT

A transmission method, system, and router based on a border gateway protocol (BGP) are provided. The method includes: notifying a standby route and a data packet ID corresponding to the standby route to a peer autonomous system (AS); receiving a data packet carrying a data packet ID from the peer AS; and forwarding the data packet via a standby route corresponding to the data packet ID carried in the data packet. The transmission performance based on the BGP can be improved by applying the present invention.

18 Claims, 3 Drawing Sheets

U.S. PATENT DOCUMENTS

2007/0091796 A1 4/2007 Filsfils et al.
2008/0013549 A1 1/2008 Okagawa et al.

FOREIGN PATENT DOCUMENTS

| CN | 101355494 A | 1/2009 |
| CN | 101355494 B | 12/2011 |
| JP | 2002-374288 A | 12/2002 |
| WO | WO 2006/093642 A2 | 9/2006 |

OTHER PUBLICATIONS

European Patent Office, Examination Report in European Patent Application No. 08773221.0 (May 25, 2010).

State Intellectual Property Office of the People's Republic of China, English Translation of Written Opinion of the International Searching Authority in International Patent Application No. PCT/CN2008/071694 (Oct. 30, 2008).

Katabi, "Staying Connected in a Connected World," PowerPoint Presentation, pp. 1-28.

Kushman, mit.edu, "R-BGP: Staying Connected in a Connected World," pp. 1-14.

$2^{nd}$ Office Action in corresponding Chinese Application No. 200710145705.2 (Nov. 29, 2010).

\* cited by examiner

TRANSMISSION METHOD, SYSTEM AND ROUTER BASED ON A BORDER GATEWAY PROTOCOL

CROSS-REFERENCE TO RELATED APPLICATIONS

This application is a continuation of International Patent Application No. PCT/CN2008/071694, filed Jul. 18, 2008, which claims priority to Chinese Patent Application No. 200710137523.0, filed Jul. 25, 2007, and Chinese Patent Application No. 200710145705.2, filed Aug. 31, 2007, all of which are hereby incorporated by reference in their entirety.

FIELD OF THE TECHNOLOGY

The present invention relates to the communication field, and more particularly to a transmission method, system, and router based on a border gateway protocol (BGP).

BACKGROUND

A border gateway protocol (BGP) is an inter-autonomous system (AS) dynamic routing protocol, which is not aimed to discover or calculate a route, but to control route propagation and select an optimal route, i.e., to automatically exchange loop-free AS path reachability information among the ASs, so as to construct a topology of an autonomous region, thereby eliminating the routing loops. Here, an AS is defined as a set of routers under the same technical administration and using the same routing policy. For example, FIG. 1 is a schematic view of a BGP network in the conventional art. In the BGP network shown in FIG. 1, an AS A has two loop-free routes to an AS D, which are that the AS A reaches the AS D via an AS C, and the AS A reaches the AS D via an AS E. The AS A selects an optimal route, for example, the loop-free route passing through the AS C, and notifies the optimal route to the AS C in the process of inter-AS route exchange.

As the Internet has become the bearer network of more and more services, increasingly high reliability of the Internet is required. Being a routing protocol among ASs in the Internet, the robustness of the BGP greatly affects the reliability indices of the Internet. For example, in the BGP network shown in FIG. 1, the AS A and the AS B both need to reach the AS D via the AS C, and the AS A also has a sub-optimal route passing through the AS E in addition to the optimal route through the AS C. However, according to a transmission method based on the BGP, the AS C cannot obtain information about the sub-optimal route. Once the path between the AS C and the AS D fails, i.e., the network topology changes, the routing protocol between the ASs needs to recalculate the routes that reflect the latest topology, which is called a "convergence" process. In the process of waiting for the convergence, the AS C may discard data packets sent from the AS A and the AS B till a new route is discovered after the convergence process is completed. For example, if the discovered new route is the sub-optimal route passing through the AS E, the AS C and the AS B respectively transmit data packets to the AS D via the AS A and the AS E. It can be seen that the data packets sent to the AS C whose destination is the AS D are discarded in the process of waiting for the convergence, thus resulting in a flow interruption.

In order to solve the problem of temporary flow interruption occurring in the process of waiting for the BGP convergence, in a resilient BGP (RBGP) method, the AS A notifies the pre-calculated sub-optimal route to the AS C as a standby route. In this manner, when the connection between the AS C and the AS D is interrupted, the AS C forwards the data packets whose destination is the AS D to the AS A via the standby route, and then the AS A transmits the data packets to the AS D via the AS E. As such, in the process of waiting for the BGP convergence, the data packets are forwarded via the pre-calculated standby route, and thus the flow will not be interrupted.

However, as the BGP convergence generally lasts for several seconds, there is not enough time for the convergence of routers within the AS A in the convergence process, i.e., the router within the AS A still uses the AS C as a next-hop AS to the AS D. If the AS A fails to identify that the data packets need to be forwarded via the sub-optimal route, the data packets will be forwarded to the AS C again, so that a loop is formed between the AS C and the ASA.

Seen from the above analysis, in the current transmission method based on the BGP, the BGP network is still not robust enough for the transmission of the data packets, and the transmission performance based on the BGP is poor.

SUMMARY

Accordingly, the present invention is directed to a transmission method based on a border gateway protocol (BGP), which can improve the transmission performance based on the BGP.

The present invention is also directed to a transmission system based on a BGP, which can improve the transmission performance based on the BGP.

The present invention is further directed to a transmission router based on a BGP, which can improve the transmission performance based on the BGP.

In order to achieve the above objectives, technical solutions of the present invention are implemented as follows.

A transmission method based on a BGP is provided. The method includes: notifying a standby route to a peer autonomous system (AS); receiving a data packet carrying a data packet ID; and forwarding the data packet via a standby route corresponding to the data packet ID.

A transmission system based on a BGP is provided. The system includes a first router in a local AS and a second router in a peer AS.

The first router in the local AS is adapted to notify a standby route to the second router in the peer AS, receive a data packet carrying a data packet ID, and forward the data packet via a standby route corresponding to the data packet ID carried in the data packet.

The second router in the peer AS is adapted to receive and store the standby route notified by the first router in the local AS, carry a data packet ID in a data packet corresponding to the standby route when the data packet needs to be forwarded via a standby route, and send the data packet carrying the data packet ID to the first router in the local AS.

A transmission router based on a BGP is provided. The router includes a standby route notification module, a data packet receiving module, and a data packet forwarding module.

The standby route notification module is adapted to notify a standby route to a peer AS.

The data packet receiving module is adapted to receive a data packet carrying a data packet ID.

The data packet forwarding module is adapted to forward the data packet via a standby route corresponding to the data packet ID carried in the data packet from the data packet receiving module.

A transmission router based on a BGP is provided. The router includes a standby route acquisition module, a data packet labeling module, and a data packet forwarding module.

The standby route acquisition module is adapted to receive and store a standby route notified by a peer AS.

The data packet labeling module is adapted to carry a data packet ID in a data packet corresponding to the standby route when the data packet needs to be forwarded via a standby route.

The data packet forwarding module is adapted to forward the data packet carrying the data packet ID from the data packet labeling module to the peer AS.

It can be seen from the above technical solutions that, for the transmission method, system, and router based on the BGP provided in the present invention, a data packet is forwarded via a standby route corresponding to a data packet ID carried in the data packet. In this manner, even in the BGP convergence process, a data packet that needs to be forwarded via a standby route can be identified according to a data packet ID carried in the data packet, thus preventing the data packet sent by the sender from being forwarded back to the sender due to a failure to identify the data packet in the BGP convergence process, i.e., avoiding the formation of a data packet forwarding loop in the BGP convergence process. Therefore, the robustness of the BGP network is enhanced and the transmission performance based on the BGP is improved.

DETAILED DESCRIPTION

In order to make the objectives, technical solutions, and advantages of the present invention comprehensible, embodiments accompanied with figures are described in detail below.

A method provided in an embodiment of the present invention includes: notifying a standby route to a peer autonomous system (AS); receiving a data packet carrying a data packet ID; and forwarding the data packet via a standby route corresponding to the data packet ID.

A system provided in an embodiment of the present invention includes a first router in a local AS and a second router in a peer AS.

The first router in the local AS is adapted to notify a standby route to the second router in the peer AS, receive a data packet carrying a data packet ID, and forward the data packet via a standby route corresponding to the data packet ID carried in the data packet.

The second router in the peer AS is adapted to receive and store the standby route notified by the first router in the local AS, carry a data packet ID in a data packet corresponding to the standby route when the data packet needs to be forwarded via a standby route, and send the data packet carrying the data packet ID to the first router in the local AS.

Here, the data packet ID may be directly corresponding to the standby route. For example, data packets to be forwarded via the same standby route carry the same data packet ID, and the data packet ID is uniquely corresponding to the standby route. Definitely, the data packet ID may also be corresponding to the standby route through a route ID of the standby route. The following embodiments are all described by taking the second case as an example.

Embodiment 1

Figure 1:
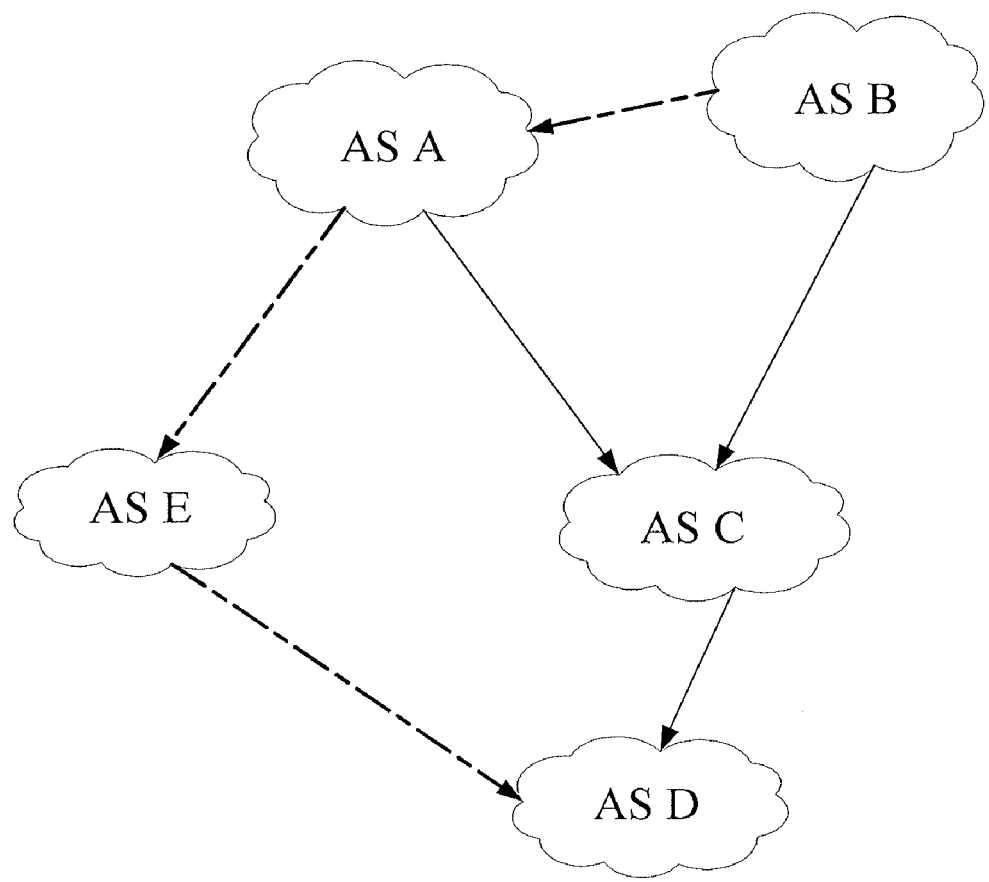
FIG. 1 is a schematic view of a border gateway protocol (BGP) network.
Figure 2:
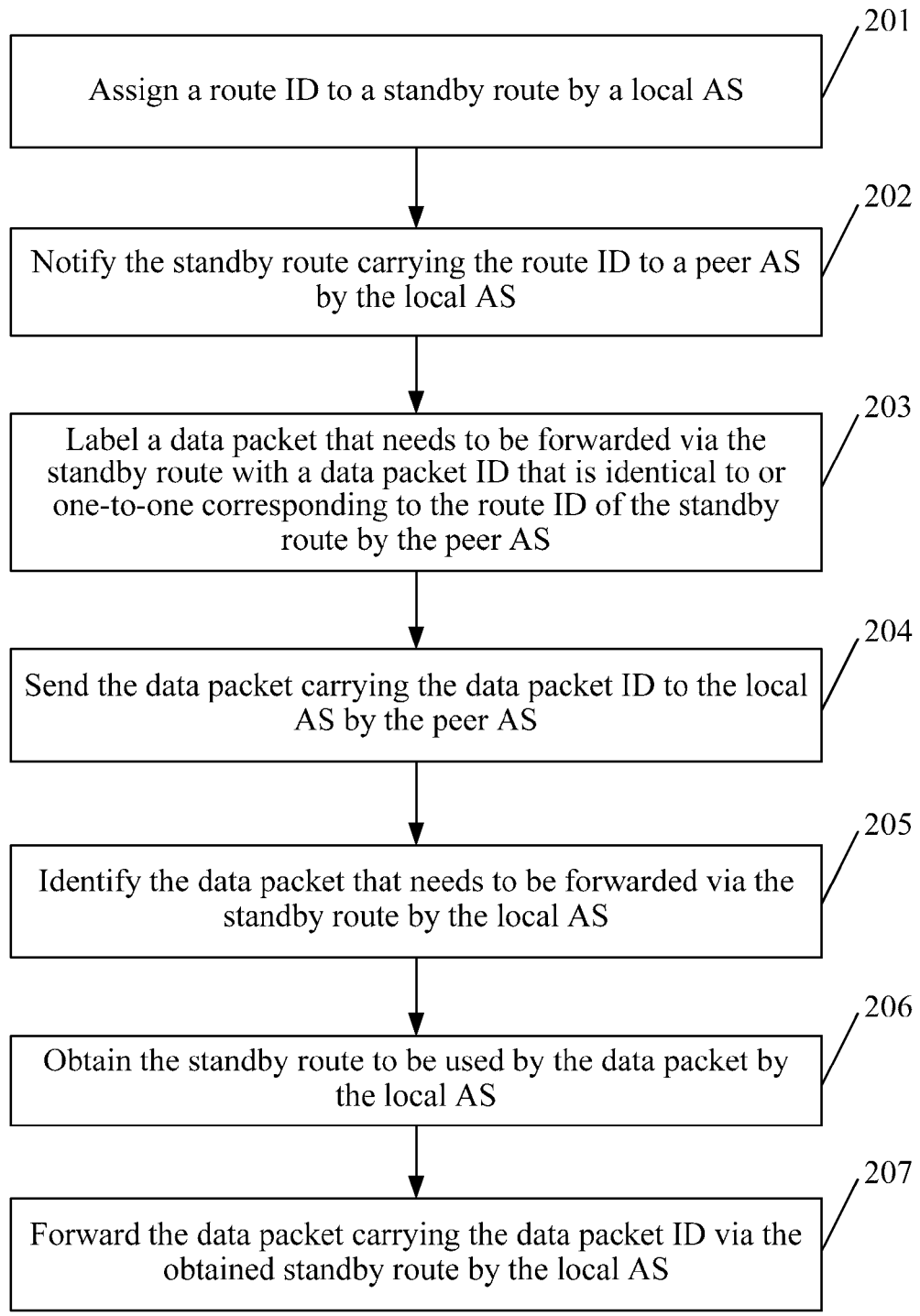
FIG. 2 is a flow chart of a transmission method based on a BGP according to a first embodiment of the present invention.

With reference to FIG. 1, FIG. 2 is a flow chart of a transmission method based on a border gateway protocol (BGP) according to a first embodiment of the present invention. In this embodiment, the AS A notifies a standby route carrying a route ID to the AS C. When it needs to forward a data packet via the standby route, the AS C sends a data packet carrying a data packet ID to the AS A. The data packet ID is identical to the route ID of the standby route, so that the AS A can identify the data packet that needs to be forwarded via the standby route. Referring to FIG. 2, the method includes the following steps.

In Step 201, a local AS assigns a route ID to a standby route.

In this embodiment, before notifying a standby route passing through the AS E to the AS C, the AS A needs to pre-assign a route ID, for example, a locally unique multiple protocol label switching (MPLS) label or other user-defined ID, to the standby route. It should be understood by those skilled in the art that the description of the route ID assigned to the standby route is merely exemplary and is not intended to limit the scope of the present invention. Here, in view of sending the notification, the AS A that sends the notification is called a local AS, and the AS C that receives the notification is called a peer AS; while in view of sending the data packet, the AS C is called the local AS, and the AS A is called the peer AS.

In Step 202, the local AS notifies the standby route carrying the route ID to the peer AS.

The AS A notifies the standby route carrying the route ID to the AS C by using the notification expansion capability of the BGP. In this embodiment, the ID of the standby route is an MPLS label, for example, label a. It should be understood by those skilled in the art that the description of the MPLS label as the route ID is merely exemplary and is not intended to limit the scope of the present invention.

When it needs to forward a data packet via the standby route, for example, the connection between the AS C and the AS D is interrupted or a certain policy requires to use the standby route, Steps 203 to 207 are performed.

In Step 203, the peer AS labels the data packet that needs to be forwarded via the standby route with a data packet ID that is identical to or one-to-one corresponding to the route ID of the standby route.

In this embodiment, after receiving the standby route carrying the route ID, the AS C labels the data packet to be sent to the AS D with an MPLS label that is identical to the route ID, for example, label a. It should be understood by those skilled in the art that the data packet that needs to be forwarded via the standby route may also be labeled with a data packet ID that is one-to-one corresponding to the route ID of the standby route, such as label 1 and A.

In Step 204, the peer AS sends the data packet carrying the data packet ID to the local AS.

In this embodiment, the AS C sends the data packet carrying the MPLS label to the AS A.

In Step 205, the local AS identifies the data packet that needs to be forwarded via the standby route.

In this embodiment, the data packet that needs to be forwarded via the standby route may be identified according to the data packet ID carried in the data packet. For example, the data packet carries an MPLS label that is identical to the route ID or carries a data packet ID that is one-to-one corresponding to the route ID of the standby route, which shows that the data packet should be forwarded via the standby route.

In Step 206, the local AS obtains the standby route to be used by the data packet.

In this embodiment, as there is only one standby route, this step may be omitted after the data packet that needs to be forwarded via the standby route is identified, that is, the data packet is directly forwarded via the only one standby route.

If there is a plurality of standby routes, each standby route may be assigned with a different route ID, for example, a locally unique label, which can uniquely determine one standby route in a standby route table of the router. All standby routes may also be assigned with the same label, which can determine that a standby route needs to be used. However, in order to know a specific standby route to be used, the standby route table needs to be looked up for a corresponding standby route according to a destination IP address of the data packet.

If each standby route is assigned with a different route ID in Step 201, in this step, after receiving the data packet carrying the data packet ID that is identical to or one-to-one corresponding to the route ID, a corresponding standby route is found by using the data packet ID. That is, the standby route to be used can be directly obtained according to the relationship that the data packet ID is identical to or one-to-one corresponding to the route ID.

If a plurality of standby routes is assigned with the same route ID in Step 201, in this step, after receiving the data packet carrying the data packet ID that is identical to or one-to-one corresponding to the route ID, a corresponding standby route set is found by using the data packet ID first, and then a corresponding standby route is found from the standby route set according to the destination IP address of the data packet. That is, a plurality of corresponding standby routes is obtained first according to the corresponding relationship between the data packet ID and the standby route, and then a specific standby route to be used by the data packet is obtained according to the destination address of the data packet.

In Step 207, the local AS forwards the data packet carrying the data packet ID via the obtained standby route.

The local AS forwards the data packet carrying the data packet ID to the destination via the obtained BGP standby route rather than a normal route. In this embodiment, the data packet carrying the data packet ID is forwarded to the AS E by the AS A, and then forwarded to the AS D by the AS E.

Through the transmission method based on the BGP according to the embodiment of the present invention, data packets that need to use an active route can be dynamically distinguished from those that need to use a standby route, and the data packet carrying the data packet ID is forwarded via the obtained route, thus avoiding the formation of a temporary data forwarding loop in the BGP convergence process.

Embodiment 2

Figure 3:
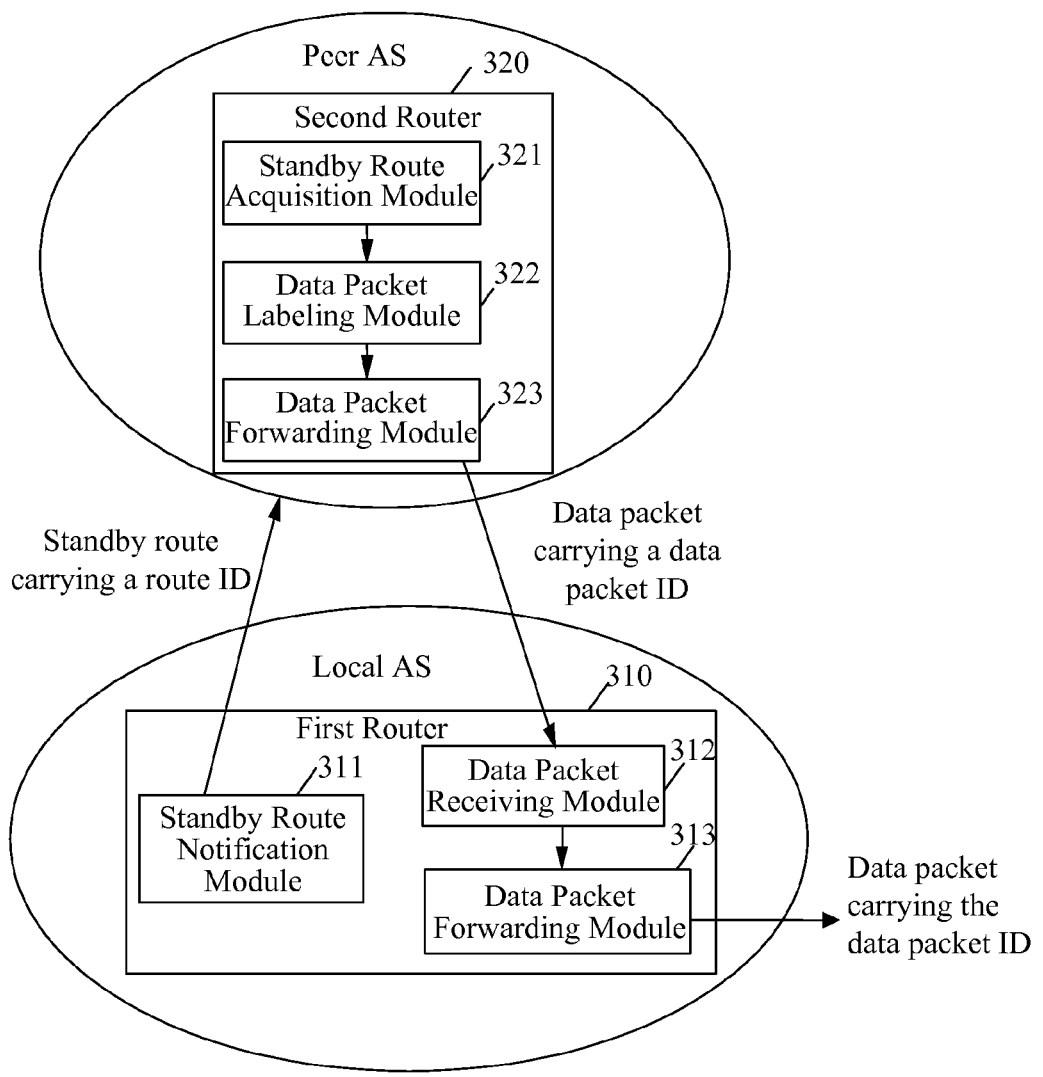
FIG. 3 is a schematic structural view of a transmission system based on a BGP according to a second embodiment of the present invention.

FIG. 3 is a schematic structural view of a transmission system based on a BGP according to a second embodiment of the present invention. Referring to FIG. 3, the system includes a first router 310 in a local AS and a second router 320 in a peer AS. In this embodiment, the first router 310 in the local AS not only forwards a data packet that needs to use a standby route, but also assigns an MPLS label to the standby route as a route ID, and notifies the standby route carrying the route ID to the peer AS. The second router 320 in the peer AS labels the data packet with the MPLS label corresponding to the standby route when the data packet needs to be forwarded via the standby route, and sends the data packet to the first router 310.

The first router 310 receives the data packet and then forwards the data packet via the standby route corresponding to the MPLS label.

In particular, the first router 310 notifies a standby route carrying a pre-assigned route ID to the peer AS, receives a data packet carrying a data packet ID, and forwards the data packet via a standby route corresponding to the data packet ID carried in the data packet.

The second router 320 receives and stores the standby route carrying the route ID notified by the first router 310, labels a data packet with a data packet ID that is identical to or one-to-one corresponding to the route ID when the data packet needs to be forwarded via the standby route, and sends the data packet carrying the data packet ID to the first router 310. In this embodiment, as the data packet ID is corresponding to the standby route through the route ID, the first router 310 not only includes a data packet receiving module 312 and a data packet forwarding module 313, but also includes a standby route notification module 311.

The standby route notification module 311 notifies a standby route carrying a pre-assigned route ID to the second router 320 in the peer AS.

The data packet receiving module 312 receives a data packet carrying a data packet ID.

The data packet forwarding module 313 forwards the data packet carrying the data packet ID received by the data packet receiving module 312 via a standby route corresponding to the data packet ID.

Likewise, as the data packet ID is corresponding to the standby route through the route ID, the second router 320 not only includes a data packet labeling module 322 and a data packet forwarding module 323, but also includes a standby route acquisition module 321.

The standby route acquisition module 321 receives and stores the standby route carrying the route ID notified by the first router 310.

The data packet labeling module 322 labels a data packet with a data packet ID corresponding to the route ID when the data packet needs to be forwarded via the standby route. In this embodiment, as the data packet ID is corresponding to the standby route through the route ID, the data packet labeling module 322 labels the data packet that needs to be forwarded via the standby route with an ID that is identical to or one-to-one corresponding to the route ID. In particular, provided that an active route fails and the data packet needs to be forwarded via a standby route corresponding to a destination IP address of the data packet, the data packet labeling module 322 labels the data packet that needs to be forwarded via the standby route with an MPLS label of the standby route.

The data packet forwarding module 323 forwards the data packet carrying the data packet ID from the data packet labeling module 322 to the peer AS via the standby route. In this embodiment, the data packet forwarded by the data packet forwarding module 323 carries an MPLS label corresponding to the standby route.

Through the transmission system based on the BGP according to the embodiment of the present invention, data packets that need to use an active route can be dynamically distinguished from those that need to use a standby route, thus avoiding the formation of a temporary data forwarding loop in the BGP convergence process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmission method based on a border gateway protocol (BGP), comprising:
   notifying a peer autonomous system (AS) of a standby route and a data packet identifier (ID) corresponding to the standby route;
   receiving a data packet carrying the data packet ID from the peer AS;
   judging whether the data packet needs to be forwarded via the standby route or not, according to the data packet ID; and
   if the data packet needs to be forwarded via the standby route according to the data packet ID, forwarding the data packet via the standby route corresponding to the data packet ID carried in the data packet.

2. The transmission method based on a BGP according to claim 1, wherein the peer AS is notified of the standby route and the data packet ID through the BGP.

3. The transmission method based on a BGP according to claim 2, wherein the data packet ID is corresponding to the standby route through a route ID for identifying the standby route.

4. The transmission method based on a BGP according to claim 3, wherein the data packet ID is one-to-one corresponding to the route ID identifying the standby route.

5. The transmission method based on a BGP according to claim 4, wherein the route ID identifies one or more standby routes.

6. The transmission method based on a BGP according to claim 3, wherein the data packet ID is one-to-one corresponding to the standby route; and
   the forwarding the data packet via the standby route corresponding to the data packet ID carried in the data packet comprises: obtaining the standby route for forwarding the data packet according to one of a corresponding relationship between the data packet ID and the standby route and a corresponding relationship between the data packet ID and the route ID identifying the standby route, and forwarding the data packet via the obtained standby route.

7. The transmission method based on a BGP according to claim 2, wherein the data packet ID is corresponding to a plurality of standby routes; and
   the forwarding the data packet via the standby route corresponding to the data packet ID carried in the data packet comprises:
   obtaining the plurality of standby routes corresponding to the data packet ID according to one of a corresponding relationship between the data packet ID and the standby route and a corresponding relationship between the data packet ID and the route ID identifying the standby route;
   obtaining the standby route for forwarding the data packet from the plurality of standby routes according to a destination address carried in the data packet; and
   forwarding the data packet via the obtained standby route.

8. The transmission method based on a BGP according to claim 1, wherein the data packet ID comprises a multiple protocol label switching (MPLS) label.

9. A transmission router based on a border gateway protocol (BGP), comprising:
   a standby route notification module, a data packet receiving module, and a data packet forwarding module;
   wherein the standby route notification module is configured to notify a peer autonomous system (AS) of a standby route and a data packet identifier (ID) corresponding to the standby route;
   wherein the data packet receiving module is configured to receive a data packet carrying the data packet ID from the peer AS;
   wherein the data packet forwarding module is configured to forward the data packet via the standby route corresponding to the data packet ID which is carried in the data packet received by the data packet receiving module;
   means for judging whether the data packet needs to be forwarded via the standby route or not, according to the data packet ID between the data packet receiving module which receives the data packet from the peer AS, and wherein the data packet forwarding module forwards the data packet via the standby route corresponding to the data packet ID carried in the data packet; and
   means for enabling the data packet forwarding module to forward the data packet via the standby route corresponding to the data packet ID which is carried in the data packet, if the data packet needs to be forwarded via the standby route according to the data packet ID.

10. The transmission router based on a BGP according to claim 9, wherein the data packet ID is one-to-one corresponding to the route ID identifying the standby route.

11. A transmission system based on a border gateway protocol (BGP), comprising a first router in a local autonomous system (AS) and a second router in a peer AS, wherein:
    the first router in the local AS comprises:
       a standby route notification module, configured to notify a peer autonomous system (AS) of a standby route and a data packet identifier (ID) corresponding to the standby route;
       a data packet receiving module, configured to receive a data packet carrying the data packet ID from the peer AS;
       a data packet forwarding module, configured to forward the data packet via the standby route corresponding to the data packet ID which is carried in the data packet received by the data packet receiving module;
       means for judging whether the data packet needs to be forwarded via the standby route or not, according to the data packet ID between the data packet receiving module which receives the data packet from the peer AS, and wherein the data packet forwarding module forwards the data packet via the standby route corresponding to the data packet ID carried in the data packet; and
       means for enabling the data packet forwarding module to forward the data packet via the standby route corresponding to the data packet ID, which is carried in the data packet, if the data packet needs to be forwarded via the standby route according to the data packet ID; and
    the second router in the peer AS, configured to receive and store the standby route and the data packet ID corresponding to the standby route notified by the first router in the local AS, carries the data packet ID corresponding to the standby route in the data packet when the data packet needs to be forwarded via the standby route, and sends the data packet carrying the data packet ID to the first router in the local AS.

12. The transmission system based on a BGP according to claim 11, wherein the data packet ID is one-to-one corresponding to a route ID identifying the standby route.

13. The transmission method based on a BGP according to claim 2, wherein the data packet ID is directly corresponding to the standby route.

14. The transmission method based on a BGP according to claim 4, wherein the data packet ID is identical to the route ID identifying the standby route.

15. The transmission router based on a BGP according to claim 9, wherein the data packet ID is directly corresponding to the standby route.

16. The transmission router based on a BGP according to claim 10, wherein the data packet ID is identical to the route ID identifying the standby route.

17. The transmission system based on a BGP according to claim 11, wherein the data packet ID is directly corresponding to the standby route.

18. The transmission system based on a BGP according to claim 12, wherein the data packet ID is identical to a route ID identifying the standby route.

* * * * *